US006877107B2

(12) United States Patent
Giotta et al.

(10) Patent No.: US 6,877,107 B2
(45) Date of Patent: Apr. 5, 2005

(54) METHOD FOR ENSURING OPERATION DURING NODE FAILURES AND NETWORK PARTITIONS IN A CLUSTERED MESSAGE PASSING SERVER

(75) Inventors: Paul Giotta, Winterthur (CH); Jesper Honig Spring, Zurich (CH)

(73) Assignee: Softwired AG, Zurich (CH)

( * ) Notice: Subject to any disclaimer, the term of this patent is extended or adjusted under 35 U.S.C. 154(b) by 818 days.

(21) Appl. No.: 09/899,662

(22) Filed: Jul. 5, 2001

(65) Prior Publication Data

US 2003/0009511 A1 Jan. 9, 2003

(51) Int. Cl.⁷ .............................................. G06F 11/00
(52) U.S. Cl. ....................................................... 714/4
(58) Field of Search ............................................ 714/4

(56) References Cited

U.S. PATENT DOCUMENTS 6,449,734 B1 * 9/2002 Shrivastava et al. .......... 714/15
6,785,678 B2 * 8/2004 Price .............................. 707/8

FOREIGN PATENT DOCUMENTS

EP         0 853 277 A2     7/1998

OTHER PUBLICATIONS

Scalability of the Microsoft Cluster Service, Werner Vogels, Dan Dumitriu, Ashutosh Agrawal, Teck Chia, Katherine Guo, Department of Computer Science, Cornell University.
The Design and Architecture of the Microsoft Cluster Service, A Practical Approach to High-Availability and Sealability, Werner Vogels, Dan Dumitriu, Ken Birman (Dept. of Computer Science Cornell University).
An Overview of the Galaxy Management Framework for Scalable Enterprise Cluster Computing, Werner Vogels, Dan Dumitriu, Dept. of Computer Science, Cornell University.

Six Misconceptions about Reliable Distributed Computing, Werner Vogels, Robert van Renesse and Ken Birman, Dept. of Computer Science, Cornell University.

Dynamic Routing in SonicMQ 3.0.

A dynamically fault-tolerant and dynamically scalable distributed tuplespace for heterogeneous, loosely coupled networds, A thesis submitted in the partial fulfilment of the requirements for the degree of Candidatus Scientiarum in Computer Science by Jesper Honig Spring.

* cited by examiner

Primary Examiner—Bryce P. Bonzo
(74) Attorney, Agent, or Firm—Rankin, Hill, Porter & Clark LLP

(57) ABSTRACT

A means for guaranteeing the proper behavior as specified by the JMS semantics of clustered message server when the individual computer that comprise the cluster are separated by a network partition. A clustered message server is responsible for the reliable transportation of messages between different distributed computer applications. It employs multiple computers to perform a function that otherwise appears to be performed by a monolithic server running on one computer, but with more capacity and reliability than can be provided by one computer. If a computer in the cluster fails, another computer should automatically assume the role of the failed computer. However, it is not possible for the other machines in the cluster to detect the difference between the failure of one or more computers in the cluster, and the failure of data network connecting those computers. In ordinary clusters, different actions would be required in these two cases, but since they are impossible to distinguish, computer failure is always assumed and network failure is ignored and the consequence non-deterministic. The invention described here provides a means of responding to failures that yields correct behavior as specified by the JMS semantics whether the failure is due to computer failure or network failure.

14 Claims, 2 Drawing Sheets

METHOD FOR ENSURING OPERATION DURING NODE FAILURES AND NETWORK PARTITIONS IN A CLUSTERED MESSAGE PASSING SERVER

FIELD OF THE INVENTION

The invention is in the field of methods and systems of delivering messages between computer programs via a message server. This invention more specifically pertains to the field of Message Oriented Middleware (MOM).

BACKGROUND OF THE INVENTION

MOM enables multiple computer programs to exchange discrete messages with each other over a communications network. MOM is characterized by 'loose coupling' of message producers and message consumers, in that the producer of a message need not know details about the identity, location or number of consumers of a message. Furthermore, when an intermediary message server is employed, message delivery can be assured even when the ultimate consumers of the message are unavailable at the time at which it is produced. This can be contrasted with Connection Oriented Middleware, which requires a computer program to have details of the identity and network location of another computer, in order that it can establish a connection to that computer before exchanging data with it. To establish a connection, both computers must be available and responsive during the entire time that the connection is active.

This invention pertains specifically to the case where an intermediary message server in employed to store and distribute messages to consumers. Although the producers and consumers (collectively referred to as clients) are loosely coupled with each other when communicating via MOM, the intermediary message servers are normally required to communicate with these clients in a connection-oriented fashion. Thus permitting senders and receivers to communicate without both being available at the same time requires the server to be available at all times. Furthermore all clients that may wish to exchange messages must be connected to the same server, or different servers which are capable or working together to achieve the equivalent functionality of a single server, i.e. to serve as a single logical server. MOM is often used in systems in which a large number of servers have to serve as one logical server, as one of the reasons for employing MOM is to alleviate the requirement of defining which programs may exchange data with each other a priori. This means that large organizations that use MOM for computer applications distributed throughout the organization, or organizations that use MOM to provide service to the general public over the Internet, must be ready to accommodate many thousands of programs communicating through a single logical server.

This invention pertains specifically to the case in which a MOM server is realized as a cluster of multiple computers. In the context of this document, we will define a cluster as a group of computers that work together to provide a single service with higher capacity and higher reliability than can be achieved using a single computer. In order to insure high reliability in the case of the failure of one or more machines in the cluster, the messages held by the server, and their associated state information, must be stored redundantly on multiple computers. This insures that the data is still available to the cluster if one computer fails.

The invention pertains to the reliable cluster that uses a primary/backup style of redundant storage. In this case, for some subset of the messages process by the message server cluster, one computer acts as the primary node. The primary node is responsible for storing the messages and actively delivering them to message consumers. One or more other computers act as backup nodes for that primary. The backup nodes are responsible for storing an identical copy of the data stored on the primary node, but they will not actively undertake to deliver stored messages to consumers. If the primary node fails, the backup node(s) must detect this failure and insure that exactly one backup is promoted to the role of primary and begins actively delivering messages to consumers. The backup(s) identify the failure of the primary through the fact that they are no longer able to communicate with it. In order to guarantee the proper behavior of the messaging system, it is important that exactly one node in the cluster act as the primary node at one time for a given subset of messages. The exact meaning of "proper behavior" will be described below.

In addition to the failure of individual computers, another type of failure that can occur in such a cluster is a network partition. The term "network partition" refers to the situation in which the data network that connects the computers in the cluster is split into two or more separate sub-networks. Each of these separate sub-networks is referred to as a partition. Each partition functions correctly except for the fact that the computers in the partition cannot communicate with the computers in the other partition. The symptom of a network partition is the same as that of node failures, namely that one or more computers become unavailable for communication. For this reason, it is, in the general case, not possible for a backup node to distinguish between an event in which it's corresponding primary node fails, and the event in which the network becomes partitioned and the corresponding primary node continues to function but is in a different partition.

This gives rise to a fundamental dilemma in the field of primary/backup style server reliability. If a primary node becomes separated from a backup node by a network partition, but the corresponding backup node assumes that it has failed, then the backup becomes a primary node. This results in the cluster having two primary nodes for the same set of messages at the same time. If both of these primaries are in contact with message consumers, then it will no longer be possible to guarantee proper behavior of the message server. If on the other hand, the primary node fails, but the corresponding backup node assumes that it is in different network partition, then the backup node will not become primary and the reliability of the message server cluster is not achieved, as no messages will then be delivered.

Message server cluster implementations according to the state of the art assume that failure to communicate with one or more computers indicates that these computers have failed. This is reasonable if one considers that computer failures occur more often than network partitions. In the case of a primary/backup reliability scheme, this leads to incorrect system behavior during network partitions, due to the fact that two computers can become primary node for the same set of messages at the same time. This invention is unique in that it provides a means to guarantee proper behavior of a clustered messaging system that uses primary/backup reliability, even during network partitions. It can do this without needing to discover if a communication failure is due to computer failure or network partitioning. As such, the invention does not provide a novel means for discovering the nature of the failure, but rather provides a means of providing primary/backup style high availability that is robust in that it guarantees the proper behavior without the need to handle both types of failure in different ways.

It is important to define the behavior that the message server cluster must exhibit in order to be considered correct. This invention guarantees correct behavior of a messaging system as defined in version 1.0.2 of the specification of the Java Message Service (JMS) application programming interface (API) published by Sun Microsystems Inc. The definition of this interface is available at http://java.sun.com/products/jms/docs.html. The key aspects of this behavior are:

Guaranteed Message Delivery: JMS defines two message delivery modes: persistent and non-persistent. It is permissible to loose non-persistent messages in the event of system failures. A JMS compliant messaging system must, however, guarantee that persistent messages can always be recovered after a system failure and that these will eventually be delivered to the intended recipient(s). Computer programs that use a messaging system to send messages with a persistent delivery mode should not need to take any additional measures to insure that the message is successfully delivered to appropriate recipient(s). It is one object of the invention to provide guaranteed persistent message delivery even in the case of network partitions separating the computers that comprise the message server cluster. (The invention also prevents the loss of non-persistent messages in the event of network partitioning, even though such loss would actually be permissible.)

Guaranteed One Time Only Delivery: JMS defines two messaging domains: point-to-point and publish/subscribe. Point-to-point messages must be delivered exactly one time to exactly one eligible recipient. These generally correspond to actions, such as depositing money in a bank account, which are not permitted to be executed more than once. Publish/subscribe messages must be delivered exactly once to each eligible subscriber. Such messages generally contain information, which may be disseminated to any number of recipients, but must be delivered exactly one time to each recipient. (In both delivery modes, the client has the option to specify that duplicate deliveries to one consumer are permissible). If a message consumer processes a message and then terminates unexpectedly before acknowledging the receipt of the message, then the message is considered undelivered according to JMS. It is a further object of the invention to guarantee both correct point-to-point and correct publish/subscribe message delivery in spite of network partitions that separate the computers comprising a message server cluster.

In Order Message Delivery: One client of a JMS messaging system may have multiple producers and consumers. These producers and consumers are grouped together into one or more sessions, where each session contains zero or more producers and zero or more consumers. All messages produced within one session must be delivered to consumers in the same order in which they were produced. The JMS specification explicitly identifies failure conditions in which it is not possible to assure both guaranteed delivery and in order delivery: when a message is delivered to a consumer, and that consumers fails before acknowledging receipt of the message, but after subsequent messages produced in the same session have been delivered to other consumers. In this case, it is permissible to deliver the message in question to another consumer, although it is out of order.

Transactions: As mentioned in the previous point, any number of the producers and consumers of one client may be grouped together into one session. Each session may optionally be specified as "transacted". The client must instruct a transacted session to commit all message produced and consumed since the last commit before the delivery of these messages becomes effective. All production and consumption of messages that occur between successive commits must succeed or fail as a single unit. This means that despite any system failure that might occur, there are only two permissible outcomes for the set of messages produced and consumed within one transacted session between two successive commits: 1) the consumption of all received messages is verified to the messaging system at the time of commit, and the produced messages become available to deliver to consumers at the time of commit, or 2) all produced messages are aborted, and all consumed messages are refused, effectively rolling back the session to the state that it was in immediately after the previous commit. Thus, if two messages are issued within the same transaction, one instructing the withdrawal of a sum of money from a bank account, and the other instructing the deposit of the same amount into another bank account, then it is never possible for the withdrawal to occur without the corresponding deposit to occur. It is thus another object of the invention to provide correct transaction semantics in spite of network partitions that may occur before a transaction is successfully committed.

In addition to the above, we intend for this invention to provide one additional aspect of behavior, which is not specified by JMS, but is critical to fulfilling the basic purpose of a messaging system:

The messaging system is at all time available to accept messages from message producers: JMS does not explicitly state any requirements regarding availability of the messaging system. A server based messaging system is, however, intended to alleviate computer programs for the need to implement store and forward messaging functionality themselves. A messaging system cannot fulfill this intention without providing some guarantee of availability. Moreover, being available to accept messages at from producers at all times is more critical in this respect that being available to distribute messages to consumers. The JMS specification, and messaging systems in general, do not guarantee a minimum delivery time from producer to consume. This is outside the control of the messaging system since it cannot assume that there are consumers available to receive messages at all times. For this reason, message consumers must be designed in a way that they are robust with respect to delays in message delivery. On the other hand, consider a simple message producer that interactively collects order information from a human user, packages that as a message, sends it to the message system, confirms to the user that the order has been placed, and only then is ready to process another order. If the message system is not ready to take responsibility for the message during this cycle, then either: 1) the user must wait an indefinite amount of time until the message system is available before he receives confirmation that the order was placed, or 2) the message producer must provide reliable, recoverable storage of the message until the message system is available. Both of these options defeat the purpose of using a message system in such a scenario. Therefore we consider the ability to accept produced messages at any time to be the paramount availability criterion for message server availability. It is thus yet another object of the invention to insure that a clustered message server is always available to accept messages from message producers, and to guarantee proper delivery of those messages, even when the cluster is subject to network partition.

This invention provides robustness to network partitioning specifically for the clustered message server described in patent application Ser. No. 09/750,009, "Scaleable Message System". For details about this messaging system, it is referred to the publication of this application, the application being incorporated herein by reference. Only a brief description will be presented here. The scaleable message system is depicted in Drawing 1. The scalable message system consists of two or more logical nodes. Each node may run on a separate computer, or multiple nodes may run on the same computer. There are two types of node: Client Managers (CM) and Message Managers (MM). Message Manager nodes are responsible for storage and distribution of messages. They are not directly accessible by Clients. Clients must connect to Client Manager nodes, and the Client Manger nodes relay Client requests to the Message Manager nodes via a reliable, atomic multicast message bus. The message bus allows data to be sent from one node to several other nodes at one time, without consuming more network resources than are required to send the same data to only one machine. Individual Client Manager nodes do not contain state information that is critical to continued function of the system, so the failure of one or more Client Manager nodes can be tolerated without the need for a backup node. If a Client Manager node fails, the Clients that were connected to it automatically reconnect to another Client Manager node and continue normal operation. Drawing 1 shows a cluster of interconnected Client Managers and Message Managers.

Message Manager nodes contain state information that is critical to the continued function of the system. For this reason their state information must be stored redundantly on multiple nodes. There are two types of Message Manager nodes: primary and backup. At any one time, each of the primary Message Manager nodes is responsible for storing and distributing a subset of the messages being transferred by the messaging system. Together, all of the primary Message Manager nodes are responsible for the complete set of messages being transferred by the messaging system at any one time. For each primary Message Manager, there is any number of backup Message Manager nodes. Each backup Message Manager node is responsible for maintaining an exact copy of the state of it's corresponding primary Message Manager node, and must be ready to assume the role of primary Message Manager if the original primary Message Manager fails. Each primary Message Manager node interacts closely with its corresponding backup Message Manager nodes, but has little interaction with other Message Manager nodes. For this reason, each groups of one primary Message Manager node and its corresponding backup Message Manager nodes is referred to as a sub-cluster.

The message server cluster described above is composed of two different types of nodes, and there are some advantages to locating these nodes on different physical computers. It is important to note that this type of message server cluster could be realized with a single type of node by combining the functionality of the Client manager and the Message Manager into a single node type. Our ability to describe the invention is, however, facilitated by using the model in which these node types are physically separate, and this model will be used throughout this document.

The invention relies heavily on the concept of a synchronous network view. The view is the list of machines with which a given node can communicate over the data network at a certain point in time. The invention assumes that all nodes that are in the view of a given node posses themselves, the same view; that is: if A is in the view of B, and C is not in the view of B, then C is not in the view of A. Thus when there is no network partition, then all nodes possess all other nodes in their view, and when the network is partitioned, then all of the nodes in a partition posses the same view, and the view does not contain any node that are in other partitions. In the preferred embodiment, the responsibility of detecting the view and reporting changes in the view is delegated to message bus that provides multicast communications within the cluster. The preferred embodiment uses the product iBus//MessageBus from Softwired AG ( www.softwired-inc.com) for this purposes, as it provides both reliable, atomic, in order multicast communication and view management.

SUMMARY OF THE INVENTION

This invention provides a means for a clustered message server to accept messages from message producing clients, and distribute these messages to message consuming clients in a way that e.g. conforms to the conditions of current JMS specification versions such as JMS specification version 1.0.2 and following versions and insures that the cluster is highly available for accepting messages, even when computers in the cluster fail or the data network that connects the computers in the cluster is split into several network partitions.

This invention is e.g. applicable to the type of message server cluster specified in U.S. patent application Ser. No. 09/750,009, "Scaleable Message System" and described previously in the background section. U.S. patent application Ser. No. 09/750,009 describes a new type of message server cluster in more detail and is incorporated herein be reference. This type of message server cluster is considered highly available, because all messages and associated state information that the server must store in order to assure proper operation can be redundantly stored on multiple different computers. This allows the message server cluster to continue normal operations without interruption and without loosing messages, in the event that one or more of the computers in the cluster fail unexpectedly.

However, the invention is also usable to message cluster systems of an architecture different from the above mentioned U.S. patent application Ser. No. 09/750,009 node architecture. An only prerequisite of a cluster to be employed with the is that a plurality of message managers is present. The message managers can in principle also function as client managers at the same time.

For point-to-point messaging, the conditions of the specification require that each persistent message be delivered to exactly one of the eligible message receivers. For publish/subscribe messaging, the conditions of the specification require that each message be delivered exactly once to each eligible subscriber. These requirements imply actions that are time consuming to coordinate among nodes on multiple physical machines. These actions include deciding which eligible receiver shall receive a message in the point-to-point domain, and when messages have been delivered to all subscribers and may safely be deleted in the publish/subscribe domain. In order to perform these actions in an efficient manner, at any given time, only one Message Manager node in the cluster should be responsible for the delivery of a given message. This is designated as a primary Message Manager node. All other Message Manager nodes that store that same message are backup Message Managers and play a passive role. Correct system behavior is assured when only one primary Message Manager exists for a given set of messages at any one time. Thus a backup Message Manager should only become a primary Message Manager after it has determined that no primary Message Manager currently exists.

This primary/backup scheme cannot insure that there is only one single primary Message Manager when the network connecting the computers is partitioned. The result of this fact is that the computers in the partitions cannot know if the computers with which they have lost contact are have ceased to operate, or if they continue to operate in another network partition. This inventions provides a scheme in which each network partition may contain a primary Message Manager for the same set of messages, without violating the conditions of the JMS specification, and without preventing Clients from sending new messages to the message server cluster.

In order to permit each network partition to have a primary Message Manager responsible for the same set of point-to-point messages as primary Message Managers in other partitions, we define two types of primary Message Manager for the point-to-point domain: normal and restricted. A normal primary is permitted to perform the full range of functions associated with a primary Message Manager for point-to-point messages. A restricted primary is not permitted to dispatch point-to-point messages sent prior to the onset of the current network failure. It is sufficient to insure that there is not more than one normal (unrestricted) primary Message Manager in a cluster in order to guarantee proper JMS semantics in the point-to-point domain.

In the publish/subscribe domain, there is no need to restrict any primaries from delivering messages. It is necessary, however, to insure that publish/subscribe messages are not deleted (except due to message expiration) from the Message Managers until the network partition or computer failure is rectified, in order to insure that possible consuming Clients in other partitions may ultimately receive all messages intended for them. In this mode of operation the primary Message Manager must retain all publish/subscribe messages and their associated delivery state, and the primary Message Manager is referred to as a retaining primary Message Manager. Note, that at any time when a partition separates Message Managers from the same sub-cluster, all primary Message Managers from that sub-cluster begin retaining publish/subscribe messages, while at most one can be a normal primary Message Manager for point-to-point messages.

After a network partition is corrected, the multiple primaries Message Manager that were previously separated in different partitions must synchronize their states so that all are updated to reflect the activity that occurred in the other partitions. Then all but one of the primaries Message Managers must revert to being backups and the single remaining primary Message Manager assumes full responsibility for the messages of that sub-cluster.

In order to reliably determine when a failure has occurred, and to determine what level of functionality the primary Message manager in a particular partition may have (normal, retaining or retaining/restricted), the following information must be available to all nodes:

Cluster Configuration: This is the configuration of cluster, as defined by the system administrator. It contains the complete description of what nodes should exist, what type they are (Client Manager or Message Manager), how they are grouped into sub-clusters and on which computers they should be running. This will normally be the same for all nodes at all times.

Network View (View): This is the list of computers that are reachable via the multicast message bus. When there is no failure, all computers share the same view, and this should be consistent with the Cluster Configuration. When a failure has occurred, then the View will not be consistent with the Cluster Configuration. If the failure is due to a network partition, then the computers within each partition will share the same view, but the view will naturally be different in each partition.

The invention uses a discrete state model to determine if the primary Message manager in a particular sub-cluster should be retaining and/or restricted. This partition state has four possible values, which are denoted by the letters A, B, C and D. Each time a view change occurs, the state of a node is re-evaluated based on the number and previous partition state of the Client Managers and Message Managers in the new Network View, as well as the intended Cluster Configuration. State A represents normal operation with no failures or failures of Client Managers only. In states B and C, the primary Message Manager is retaining but not restricted. In state D, the primary Message Manager is restricted and retaining. The state model allows both a high degree of continued operation and guaranteed JMS conformance even when multiple successive complex network partitions occur.

For publish/subscribe messaging, a retaining primary will function almost the same as a normal primary. The single difference is that a retaining primary cannot know if there are subscribers in other partitions that have not yet received a given message, so it should not delete messages until the failure is corrected and all primaries for that sub-cluster can reconcile their state, except in the case that messages expire before the failure is corrected.

For point-to-point messaging, a restricted primary is more limited in the actions that it is allowed to perform, compared to an unrestricted primary. A restricted primary may accept incoming messages at any time. It may only distribute messages that have been received after the most recent View change, as these messages are guaranteed not to be present in any other partition. Since all messages produced by a single session must be delivered in order, it is possible that messages received by a destination in the current view are queued behind messages from the same Client session received during a previous view, and are thus not available for distribution until partitioning is corrected.

The invention does not assume that View change events are issued immediately after a failure occurs. There is usually some time delay before the view manager (the multicast message bus in the case of the preferred implementation) can determine conclusively that a failure has occurred without risking excessive false alarms. It is possible that after a network partition occurs, each partition detects the failure at different times. This can result in dangerous scenarios in which one partition promotes a backup Message Manager to be an unrestricted primary before the primary Message Manager in the other partition detects that it must commence restricted operation.

In order to prevent duplicate message delivery during the interval between the occurrence of a failure and a view change, there is an extra check performed by the Client Manager during message dispatch. Each time a message is sent from a Message Manager to the Client Managers for dispatch, each Client Manager that receives the message sends an acknowledgement to all other Client Managers that confirms that it has seen the message. The one Client Manager that is actually responsible for forwarding the message to a Client consumer will hold the message until it receives acknowledgements from a majority of the other Client Managers in the same network view. If a failure has occurred that could potentially lead to duplicate message delivery before the corresponding view change is reported, the majority of acknowledgements cannot be received and the message will be rejected by the Client Manager.

In general, an important idea of the invention is that in an event of a network partition, each node evaluates a partition state information. A first, important distinction is between the two operational states restricted and an unrestricted. It has to be made sure that two message managers can not dispatch the same point-to-point message. Thus, a criterion is established ensuring that of two message managers not "seeing" each other, i.e. not being able to communicate due to lacking (hardware or software) network connection, and being responsible for dispatching the same point-to-point messages only one can be in the unrestricted state. Only message managers in the unrestricted state can dispatch messages created prior to the time the network partition occurred.

There are different possibilities to establish a criterion for determining whether a message manager is to be put in a restricted or unrestricted category, i.e. in the restricted or unrestricted operational state. According to the four state model mentioned above and outlined in more detail further below, the criterion is that the message manager has to have partition state A, B or C to be in the unrestricted state. Whether a server is attributed partition state A, B or C depends on the number and kind of nodes available for communication as well as on the history, i.e. on which was the partition state before the last view state change.

This four state model or a simplified or even a more sophisticated version of it can apply to architectures with two distinct kinds of nodes—message managers and client managers—of the kind disclosed in the above mentioned U.S. patent application as well as e.g. to architectures of the conventional kind where every server acts as both, client manager and message manager. A further possible criterion is e.g. to designate one server node to be a particular (alpha, or "tie-breaker") server. All servers contained in the partition of the alpha server are unrestricted, all other servers are restricted. Further criteria may use information about particular client connections etc. It, however, is crucial that always only one partition may be unrestricted.

A second, important distinction is between the two operational states retaining and an non-retaining. According to the four state model a message manager is in the non-retaining operational state if it is in partition state A, otherwise it is in the retaining operational state. According to this model, partition state A is attained if all message managers are available within the sub-cluster and if at least one client manager is available.

According to a special embodiment there may optionally be further partition states relating to the quantity of message server nodes available. Also this embodiment is explained with reference to the mentioned four partition state model.

The invention is motivated by the wish to obtain a method which guarantees JMS semantics during the event of a network partition or a node failure, which two events can not be distinguished by a server of the cluster. However, the invention is equally well suited for guaranteeing proper operation in the event of a network employs a different middleware, especially a message oriented middleware. The expert will immediately realize that the concept of the invention is not based on a specific computer software or computer language but rather relates to network architectures as such.

DESCRIPTION OF THE PREFERRED EMBODIMENTS

In the following, preferred embodiments of the invention are described with reference to drawings.

Figure 1:
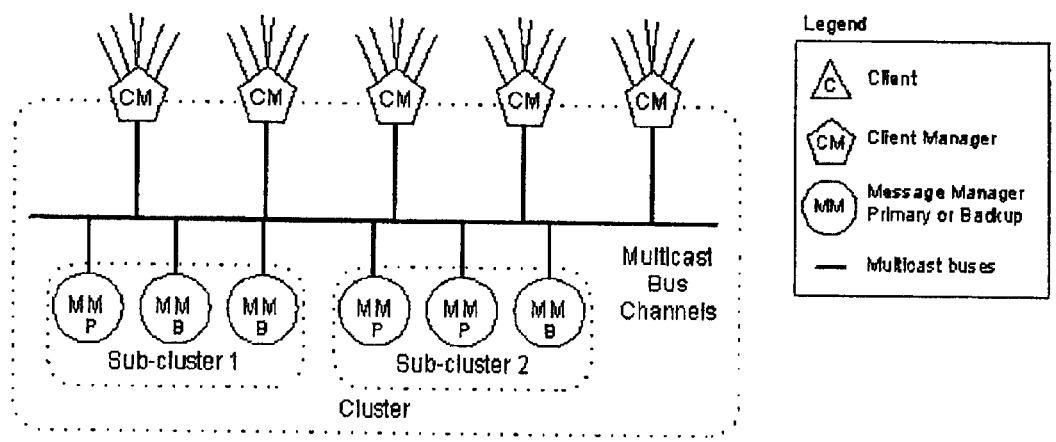
FIG. 1 shows a clustered message passing system.

The cluster illustrated in FIG. 1 contains two sub-clusters 1 and 2, each containing three Message Managers MM, and five Client Managers CM. Each of the five Client Managers has a number of Clients connected. In each of the sub-clusters there is one primary Message Manager and two backup Message Managers. The drawing shows how the nodes (Client Managers and Message Managers) are connected on a cluster-wide message bus.

Figure 2:
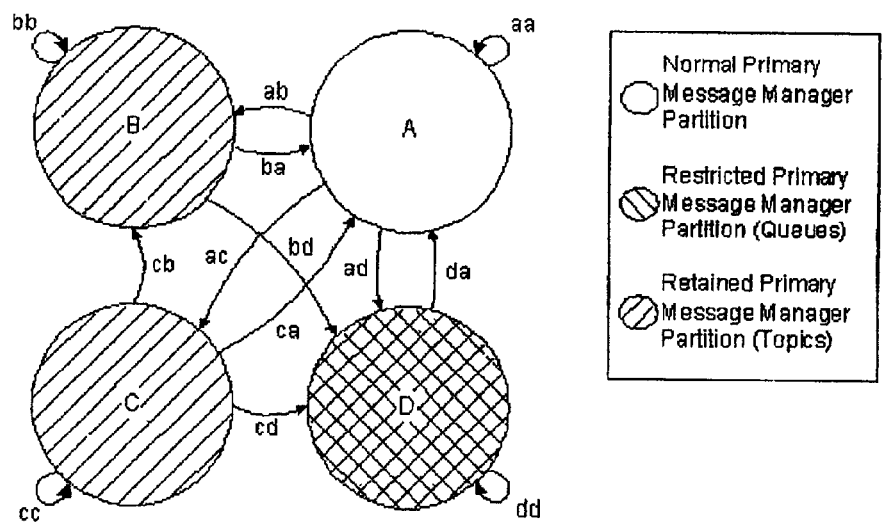
FIG. 2 illustrates a Partition State Transition Graph consisting of nodes and unidirectional vertices interconnecting the nodes.

According to the model represented in FIG. 2, four different states represented by nodes A, B, C, D are assumed. Each node represents a Partition State, and this Partition State is determined independently for each sub-cluster in each network partition. The unidirectional arrows represent an event resulting in a transition from one Partition State to another. Transitions occur as the result of view change events. Below, each of the events leading to a transition from one Partition State to another (or the same) is described:

Vertex aa—All Message Managers within the same sub-cluster remain available, and one or more of the Client Managers are available to those Message Mangers Vertex ab—All but one of Message Manager within the sub-cluster have become unavailable, and a majority Client Managers are available to the remaining Message Manager.

Vertex ba—All other Message Managers within the same sub-cluster have become available, and one or more of the Client Managers are available to those Message Managers.

Vertex bd—One or more, but not all, Message Managers from the same sub-cluster having current Partition State D have become available in this partition, along with the single Message Manager from this sub-cluster (which previously had Partition State B) that was already in this partition, and one or more of the Client Managers are available to those Message Mangers.

Vertex bb—The single Message Manager from this sub-cluster (which previously had Partition State B) that was already in this partition remains the only Messages Manger from this sub-cluster that is available in this partition, and one or more of the Client Managers are available to that Message Manager.

Vertex ac—Two or more, but not all, Message Managers from this sub-cluster remain available, and a majority of the Client Managers are available to those Message Managers.

Vertex ca—All other Message Managers within the same sub-cluster have become available, and one or more of the Client Managers are available to those Message Managers.

Vertex cb—All but one of Message Manager within the sub-cluster have become unavailable, and a majority Client Managers are available to the remaining Message Manager.

Vertex cc—Two or more Message Managers from this sub-cluster remain available, a majority of the Client Managers remain available to those Message Managers, and at least one Message Manger from this sub-cluster remains unavailable.

Vertex cd—A majority of the Client Managers have become unavailable and at least one Message Manager from this sub-cluster remains unavailable, or other, but not all, Message Managers from the same sub-cluster having current Partition State D have become available.

Vertex ad—A majority of the Client Managers have become unavailable, and at least one Message Manager from this sub-cluster has become unavailable Vertex da—All Message Managers are available within the sub-cluster, and one or more Client Managers are available to those Message Managers.

Vertex dd—At least one Message Manager from this sub-cluster remains unavailable.

As can be seen from the drawing, a partition containing Message Managers and Client Managers being in Partition State A, B or C can have a primary Message Manager operating in unrestricted mode with regards to point-to-point messages, and it may dispatch point-to-point messages normally. On the other hand, in Partition State D a primary Message Manager is operating in restricted mode with regards to point-to-point messages. With regards to publish/subscribe messages, the primary Message Manager operates in non-retaining mode and can run normally in Partition State A. In Partition States B, C and D, the primary Message Manager operates in retaining mode and may not delete messages prior to their expiry.

For each network partition, one partition will move to Partition State B or C and all others will move to Partition State D. To move out of Partition State D, all Message Managers must be available within the same partition. Thus, only one partition can have Partition State B or C at any time.

According to a further, simplified embodiment of the invention, a three state model may be applied combining states A, C, and D. In analogy to the above model, a message manager is attributed an unrestricted operational state if it is in partition state A or C and a restricted state operational state if it is in partition state D. Also, it is attributed a non-retaining operational state if it is partition state A and a retaining operational state otherwise. According to this simplified model, only the number and kind of nodes available for communication decides which partition state is attributed to a server and not its 'history':

state A: all message managers within the sub-cluster are available state C: not all message managers within the sub-cluster are available and a majority of the client managers is available state D: not all message managers within the sub-cluster are available and not a majority of the client managers is available.

Also this simplified model ensures JMS semantics. The four state model, however, in comparison includes more situations (c.f. vertex bb) where the server is attributed an unrestricted operational state.

The ultimate purpose of the four state model or more sophisticated or simpler variations of it is to properly handle the case of multiple successive network partitions. This might be case when an inexperienced technician incorrectly tries to repair the original partition, or when the firmware in a network switch goes berserk and start randomly segregating computers. The state model provides a very high degree of robustness and prevents the system from becoming vulnerable to total failure after the first partition occurs.

Figure 3:
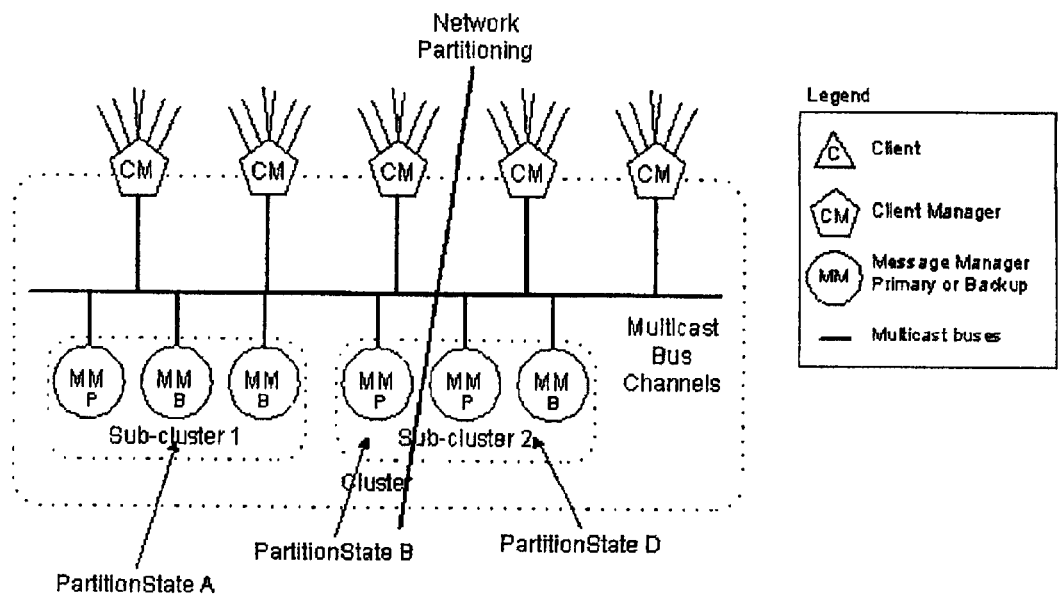
FIG. 3 shows a clustered message passing system after a network partitioning has occurred.

In complete analogy to the cluster represented if FIG. 1, the cluster of FIG. 3 contains two sub-clusters 1 and 2, each containing three Message Managers, and five Client Managers. Each of the five Client Managers has a number of Clients connected.

The drawing shows how a network partitioning has partitioned the sub-clusters in such a way that sub-cluster 1 is not affected by the partitioning other than the fact that two Client Managers are unavailable. As such, the nodes in sub-cluster 1 are still in Partition State A. Sub-cluster 2, on the other hand, has been partitioned in such a way that the primary Message Manager was partitioned away from its backup Message Managers. The original primary Message Manager resides within the partition having a majority of the Client Managers whereas the other two Message Managers have a minority of the Client Managers. In the absence of a primary Message Manager, the partition of sub-cluster 2 originally having two backup Message Managers has promoted one of the backup Message Managers to primary.

However, this new primary Message Manager will have Partition State D and thus be restricted and retaining. The original primary Message Manager is in Partition State B, and is retaining.

Figure 4:
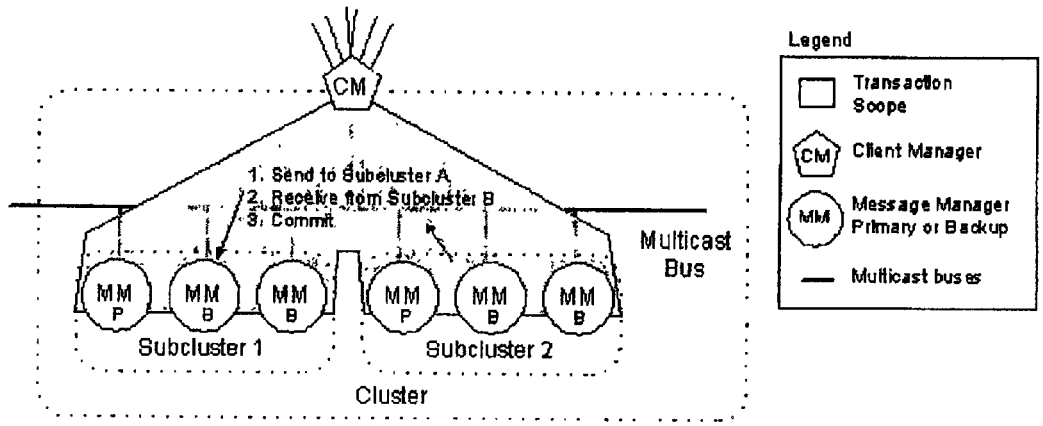
FIG. 4 illustrates the processing of a simple transaction in a clustered message passing system.

FIG. 4 illustrates the processing of a simple transaction in a clustered message passing system. As can be seen, the transaction spans two sub-clusters, illustrated with gray shading, and consists of a message being sent and a message being received.

In FIG. 4, a Client connected to the Client Manager has created a transacted session. The Client Manager acts as a Transaction Manager. The Client then sends a message, which destination is in sub-cluster 1, and receives a message located on a destination in sub-cluster 2. The Client then requests the transaction to be committed, which the Transaction Manager multicasts on the multicast bus, and returns the result of that operation.

Figure 5:
FIG. 5 illustrates the execution of a transaction over time.

FIG. 5 illustrates the execution of a transaction over time. The messages of a transaction includes the messages sent and received in a transacted session since the last abort/commit. As can be seen from the figure, the transaction contains three message operations—the sending of a message, and two message receptions—and a commit.

The invention neither prevents the occurrence of, nor rectifies node failures and network partitions. Instead, the invention recognizes that these events are possible, and presents a solution enabling the cluster to still be able to guarantee the JMS semantics even during these period after such events occur and before they are rectified. This is done by enabling all the Client Managers and Message Managers, and thus the whole partition(s), to detect and identify when a cluster (or a partition of it) is in a state where performing certain operations could lead to a break in JMS semantics. Specifically, having detected and identified such a state, each node is able to conclude whether a given operation—on message granularity—could lead to the JMS semantics being broken, and thus refrain from performing the operation until it is semantically safe again to do so.

The invention supports proper operation when the cluster is concurrently split into any number of network partitions. However, the invention assumes that the cluster is configured in such a way that all Client Managers can never be partitioned from all Message Managers. The consequence of this would simply be that the cluster would stop functioning. This can easily be guaranteed by co-locating some Client Managers and Message Managers on the same machines.

The invention also supports the sub-cluster abstraction meaning that the cluster can have one or more sub-clusters each containing a primary Message Manager and zero or more backup Message Managers. Each sub-cluster is responsible for delivery of a disjoint subset of messages as determined by the load balancing logic. Since a primary Message Manager and all its backups are located in a single sub-cluster, node failures and network partitioning issues are handled in each sub-cluster separately. The case in which responsibility for messages is not spread over multiple sub-clusters, and all messages are handled by a single cluster of message managers is a special case of the sub-cluster abstraction in which the number of sub-clusters is equal to one.

Finally, the invention also supports transaction processing, that is, the atomic execution of multiple message operations (send/receive), and guarantees JMS semantics even during node failures and network partitions when executing transactions.

The invention relies on each Client Manager and Message Manager in a cluster to be able to detect and identify the state of the cluster (or a partition of it) by holding various state information. This state information is used to give each node knowledge about the expected and the actual state of the cluster, which is an important aspect in order to make the nodes aware of when potential semantical errors can occur, and thus enabling them to prevent the JMS semantics from being broken. The states held by the Client Manager and Message Manager that are relevant to the invention are:

Configured State—Defines how the cluster is configured, that is, how many Client Managers and Message Managers, and the grouping into sub-clusters, which the Administrator has configured the entire cluster to have. Every time the Administrator adds a node or removes a node from the cluster, this state changes. A state sequence number identifies the state—containing information about the Client Managers, Message Managers and their grouping into one or more sub-clusters—which is incremented each time the state is updated. For the nodes in the cluster to function properly they must have a consistent view of the Configured State.

To ensure the highest level of flexibility by allowing the Administrator to change this state during node failures and/or network partitions, but at the same time ensure consistency across nodes, a majority voting approach is used when changing the state. The majority voting approach allows the Administrator to change the Configured State as long as at least a majority of nodes are available. The nodes unavailable when the Administrative changes the Configured State will thus be inconsistent, and will be updated when they reconcile with the rest of the cluster.

View State—Defines the current view of the cluster as seen by the underlying multicast layer, that is, how the cluster currently appears in terms of Client Managers and Message Managers, and the grouping in sub-clusters. In contrast to the Configured State, each node's View State only contains those nodes that are currently reachable to the node via the multicast layer. The state is identified by a state sequence number, which represents a data structure containing information about the Client Managers, Message Managers, and the grouping in sub-clusters within the view. As two partitions may both have the same state sequence number, but the context of the two states are different, the state sequence number does not map one-to-one to a data structure.

The state changes every time one or more nodes become available or unavailable to the cluster. As such, the View State changes due to node failures and recovery or partitioning and healing of the network as well as the Administrator adding or removing a node to/from the cluster, that is, changing the Configured State.

Partition State—Defines what the partition—given how the cluster/sub-cluster currently appears according to the View State compared to the Configured State—or whole cluster, if no failures have occurred, in terms of message handling is allowed to do. All nodes within a sub-cluster have the same Partition State if no failures have occurred. There might at some point be inconsistency between the nodes with regards to the Partition State, but that will be resolved once a View State change—that will have to come—triggers and the nodes then synchronize.

Where as the Configured State and the View State have infinite state sequence numbers, the Partition State takes a finite value of A, B, C or D depending on the number of Client Managers and Message Managers in the current View State compared to the current Configured State. As such, a change to the Partition State is triggered by a change in the View State by the multicast layer.

Since the Client Managers are shared between multiple sub-clusters, and the Client Managers need to know the Partition State of a given sub-cluster, this means that the Client Managers should be able to hold multiple Partition States—one for each sub-cluster represented in the current View State. The reason that Client Managers need to know about the Partition State is that they must to be able to block messages from being sent by a given sub-cluster, if necessary, as will be described later.

Destination State—Defines the internal state of each destination per Message Manager, which includes the messages currently stored in the destination, with their global identification, priority, delivery mode, and publishers, along with delivery state, locks, subscription definitions, individual subscription states, etc. A Destination State does not have an identifying sequence number, but is defined by its data structure representing the above-mentioned information.

The nodes in a sub-cluster exchange state information during View State changes. Using this approach, state conflicts—the scenario where multiple nodes have different Configured States, View States, Partition States and Destination States—are detected as part of a View State change. If a state inconsistency is detected, it is resolved by synchronizing the state as described later.

During the lifetime of a cluster/sub-cluster its—and thus its nodes'—Partition State may change multiple times as part of View State changes, depending on the frequency of network partitions and node failures. The invention uses a state machine approach to define the possible state transitions for the Partition States. Drawing 2 shows the possible Partition States, represented as nodes, and the possible transition events between them, represented as vertices. The starting point for the transition graph is Partition State A where it is assumed that all Client Managers and Message Managers are available initially when the system starts. As can be seen from Drawing 2, a partition containing Message Managers and Client Managers being in Partition State A can have a primary Message Manager that operates normally. On the other hand, in Partition State B, C and D a primary Message Manager cannot operate normally in that it is:

Restricted—in terms of point-to-point messages, the primary Message Manager is restricted in what point-to-point messages it can send. A primary Message Manager is restricted in Partition State D.

and/or

Retaining—in terms of publish/subscribe messages, the primary Message Manager has to retain publish/subscribe messages that would otherwise have been disposed. A primary Message Manager is retaining in Partition State B, C and D.

The semantics of being restricted and retaining is described later. During all state transitions, any partition without a primary Message Manager will promote a backup Message Manager as new—and perhaps restricted/retaining—primary, and any partition that has an normal primary Message Manager will be demoted to restricted primary Message Manager when entering Partition State D, and demoted to retaining primary when entering Partition States B, C or D Another important point to note from Drawing 2 is that the cluster/sub-cluster can only leave Partition State D by going to Partition State A. This can occur if and only if all Message Managers within the cluster/sub-cluster as defined in the Configured State are available, meaning that the cluster/sub-cluster in terms of available Message Managers should fully recover from the network partitioning or node failures. Expressed in terms of states, this means that when the current View State of the cluster/sub-cluster in terms of Message Managers grouped per sub-cluster equals the configuration as set up by the Administrator and as represented in the Configured State.

This categorization of Partition State means that if a partitioning of the network into two disjoint partitions occurs one partition must have Partition State D and the other must have Partition State B, C or D. The reason for having both the Partition State B and C is to prevent unecessary restrictions in the event of successive network partitions. Drawing 3 shows an example of a partitioned cluster/sub-cluster with Partition States annotated.

The implications of being a restricted/retaining primary Message Manager in Partition State D for queue and topic destinations is as follows:

For point-to-point destinations, it means that the restricted primary Message Manager is restricted from sending messages that have been received in any previous View State. Instead, point-to-point messages are blocked, as they are potential duplicate message candidates. The reason for this is that another normal, and thus unrestricted, primary Message Manager could run in another network partition, and might or might not send the candidate messages. In addition to blocking point-to-point messages received in any previous View State, the restricted primary Message Manager also blocks queue messages succeeding a blocked message on a destination, if they originate from the same session. This way the partial ordering of messages is ensured. The point-to-point messages being blocked cannot be sent until the sub-cluster recovers from the network partition or node failures in such a way that it would be in Partition State A.

If a primary Message Manager nevertheless tries to send a duplicate queue message candidate, due to a state inconsistency at the time of the partitioning of the network, the message will be sent back to the Message Manager by the Client Manager—responsible for dispatching the message to the Client—with a notification that the primary Message Manager should stop sending the messages from a previous View State. The reason that the messages will be sent back is that the receiving Client Manager requires—as part of the checking to prevent duplicate message candidates from being sent—but will not receive acknowledgements from a majority of the other Client Managers within the current View State permitting it to dispatch the message to the Client. The reason it will never receive acknowledgements from a majority of Client Managers is that at most one partition may contain Message Manager that are not in state D. If this one partition is subsequently split, then at most one of these subsequent partitions may contain a majority of Client Managers.

As such, if, destination at the point in time where the network partitioning occurs, a point-to-point destination does not contain messages to be processed, the "restricted" primary Message Manager has no restrictions in the new View State. Thus, under these conditions the restricted primary can continue normal operations without breaking the JMS semantics.

For publish/subscribe destinations the implications of being a retaining primary Message Manager are different, since the notion of avoiding duplicate messages in the publish/subscribe sphere does not make sense. As such, for publish/subscribe destinations the retaining primary Message Manager does not block any messages. The semantic requirement of publish/subscribe destinations is that messages published to a destination are all delivered to all of the subscribers of that destination. Once a publish/subscribe message (durable or non-durable) has been delivered to all interested subscribers, the message manager can then remove the message. This causes a problem during a network partitioning, as Clients (subscribers) connected on one partition cannot receive the messages published on another partition due to the partitioning. Therefore, it is impossible to know when a given publish/subscribe message has been delivered to all subscribers in the cluster. To deal with this, the invention proposes halting of disposal of publish/subscribe messages in all Partition States other than A—only publish/subscribe messages in Partition State A will be disposed. Instead, publish/subscribe messages will be kept on the destinations until the network partitioning has healed in such a way that the entire cluster is back in Partition State A. Since all primary Message Manager regardless of their Partition State cannot reach all subscribers due to the network partitioning, they are all retaining meaning that they have to retain the publish/subscribe messages instead of disposing them. An exception from this relates to message expiration. The invention lets message expiration take precedence over delivery to all subscribers during node failures and network partitioning, which is in compliance with the JMS semantics.

When a partitioning of a network is rectified, the partitions of the cluster/sub-cluster merge together, and thus a Partition State transition occurs as part of the View State change. The Partition State transition also occurs if another partitioning of the network immediately overtakes an existing partitioning of the network. In both scenarios the nodes may have different Configured States, Partition States and View States, though the states are consistent within the partitions; at minimum a majority of the nodes agrees on the Configured State. To merge the network partitions, all nodes within the new view—partitioned or not partitioned cluster/sub-cluster—must first agree upon and set a new View State sequence number to the highest View State sequence number found in the new view incremented by 1, and update the View State data structure correspondingly.

Having updated the View State, each of the nodes in the new view exchanges the Configured State and Partition State that they possessed prior to the view change, and whether or not they are primary Message Manager. This state information is exchanged by multicasting a message to be received by all other nodes. Having received this message from all nodes in the new view, each of the nodes updates their state information using the following rules:

The highest Configured State sequence number between all the nodes in a View State takes precedence over a lower Configured State sequence number. The nodes within the new view—partitioned or not partitioned cluster—adapts the highest Configured State number between all nodes, and the nodes updates their configuration corresponding to the new Configured State, if necessary.

Using it's own current Partition State and the new View State compared to the new Configured State, each of the nodes update the Partition State using the partition transition graph showed in Drawing 2. This will lead all nodes within a view to have the same Partition State.

Having synchronized these states, the Message Managers have to agree on a primary Message Manager in each of the sub-clusters affected by the state change. From the information multicasted, each Message Manager can detect if other Message Managers are claiming to be primaries. If no Message Manager claims to be primary within a sub-cluster, the Message Manager in each sub-cluster having the highest rank then promotes itself to primary. If, on the other hand, more than one Message Managers claim to be primaries, all primary Message Managers except for the primary Message Manager with the highest rank—a rank indicated by the order in which the Message Manager was enrolled into the cluster—demote themselves as primaries. In this process, the primary Message Manager checks to see what Partition State it is in. If it is in Partition State B, C or D, it demotes itself to only retaining primary Message Manager, and if it is in Partition State D it also demotes itself to restricted primary Message Manager.

Having agreed on a primary Message Manager in each sub-cluster, the Message Managers then synchronize their Destination State in order to achieve consistency with regards to destinations, that is, exchange information about messages that might have been received from producers or sent to consumers in each partition during the network partitioning or node failure. This is done by using a approached based on anti-entropy, that is, a method for reconciliation of two entities—in this case partitions. Having synchronized the Destination State, the primary Message Manager in each sub-cluster evaluates if some unsent queue or topic messages should be sent. Also, the primary Message Manager in each sub-cluster evaluates if there are blocked messages, and whether or not they have been sent or not, and in the latter case whether they can now be sent. Finally, the primary Message Manager in each sub-cluster evaluates if there are topic messages that can now be disposed.

The node states and their deterministic behavior provide a solid foundation on which message delivery can be performed in a fasion that is semantically correct during node failures and network partitioning. However, for this to succeed the message delivery mechanism has to be adapted to and exploit it.

For general message passing, a Client sends a message to the Client Manager on which it is connected. Upon receiving the message, the Client Manager tags the message with the current View State sequence number. The purpose of the tag is to identify messages received during one View State and sent during a newer View State. These are exactly the messages that are potential duplicate message candidates. The reason is that when the View State changes, a network partitioning may have occurred after which the primary Message Manager in both network partitions will try to send the same message in the belief that they were the only one doing it. Thus, using the tag messages that are potential candidates for duplication can be identified and appropriate actions taken.

The Client Manager now sends the message to its destination, that is, queue or topic on the Message Managers. The Client Managers all know about all possible destinations, and thus stamps the message with the selected destination before multicasting the message on the sub-cluster multicast layer. Upon receiving the message, only the primary Message Manager acknowledges the reception of the message. The backup Message Managers does not acknowledge it, but instead they simply listen for the primary Message Manager to acknowledge the message. Having done so, the backup Message Managers registers this. This is useful in the scenario where the primary becomes unavailable after having received a message but before having acknowledged it; a new primary Message Manager would then know if the message should be acknowledged to the Client Manager or not. Once a Client Manager receives an acknowledgement for a message by the Message Manager, it acknowledges the reception to the Client and removes the message from memory.

The primary Message Manager now selects a single Client that should receive a given queue message, or multiple Clients for a given topic message. Having done so the primary Message Manager stamps the message with the identification of the session(s) to receive the message and multicasts it on the sub-cluster channel to be received by the Client Managers and Message Managers. Upon multicasting the message, all Message Managers (primary and backups) receive the message sent by the primary Message Manager and all register that the primary Message Manager sent it out. Before a Client Manager does the actual dispatching of a message to the client, it needs to receive acknowledgement to do so from a majority of the Client Managers in the current View State. Each Client Manager—including the Client Manager that is responsible for the actual dispatching—that receives a message to be sent will acknowledge the receipt by multicasting an acknowledgement on the sub-cluster multicast layer. The acknowledgement by the Client Manager responsible for the sending of the message is received and registered by all Message Managers. If the responsible Client Manager receives a majority of acknowledgements from the Client Managers—including its own vote—the message is then sent to the Client, and the Client Manager will then wait for an acknowledgement from the Client. The reason for using this acknowledgement scheme is to ensure that a message cannot be sent in a partition with a minority of Client Managers in the current view state, even before the view change occurs.

When the Client Manager receives acknowledgement from the Client, it multicasts this acknowledgement on the multicast layer to be received by all Message Managers in the sub-cluster. The Message Managers and the sending Client Manager all registers that the message has been successfully received by the Client, and mark the message to be cleaned up.

If the Client session is not available on the Client Manager anymore when the primary Message Manager sends a message, the Client Manager sends a message back stating this, which causes the Message Managers to unmark the message as being sent to a Client Manager, and then, in the case of a point-to-point message, it can be resent. In the case of a non-durable publish/subscribe message, the Client Managers simply sends back a message saying not to send to the specific Client anymore, no further action need be taken. For durable subscribers the Client Manager would send a message back saying that the Client did not receive the message, and thus the message must be retained at least until that time when the durable subscriber reconnects to the message server cluster.

Destinations may for various reasons at any point in time receive messages from a given Client session out of sequence. This can happen if a session for instance misses one or more messages from a Client session. Specifically, a destination may be requested to receive message having sequence number X+10 without having received all previous messages. This only happens if some failure in the cluster occurs at which a Client that was publishing on a destination on one sub-cluster is moved to publish on the same destination on another sub-cluster. This could potentially lead to out-of-order delivery to the Clients if the primary Message Manager would send message X+10 published to a destination on one sub-cluster to a Client before the primary Message Manager sent the message X+9 published to the same destination on another sub-cluster.

Specifically, this can happen if a Client looses its connection to a Client Manager on which it has produced messages to some destination after which it will reconnect to the cluster from another Client Manager. Normally, this does not pose a problem as the new Client Manager from the reconnect request can see which sub-cluster the Client has been publishing to per destination. However, assuming that the cluster/sub-cluster is network partitioned and the new Client Manager used as entry point to the cluster/sub-cluster is in another partition than the former Client Manager, there is a potential semantic problem. The problem lies in maintaining the partial ordering of message delivery on a given session. The problem origins from the fact that a given destination can be split across multiple sub-clusters—each having a subset of the entire set of messages—and that during failures Client sessions may have had to publish to the same destination on different sub-clusters.

The reconnect request by the Client can reveal that the Client previously published messages to another sub-cluster. As such, to prevent any semantic problems from arising, the Client Manager tries to reconnect the Client to the previous sub-cluster if this is possible. If this is not possible, the Client Manager will accept the reconnection request anyway and leave it to the primary Message Manager to solve any semantic problems.

To solve the potential semantic problem, each message published by a Client to a destination has an identification, assigned by the Client, of the session, destination and message sequence number within that combination of destination and session—whether this is a part of the unique identification or not. From this information, the primary Message Manager can then see if there are gaps in the messages sequence for the destination. Once the primary Message Manager detects that messages from a given session to a given destination are missing, the successive messages are blocked, that is, they will not be sent before synchronization of the destinations leading to a complete sequence of in-order messages on the destination, and the partial ordering thus is observed.

The invention also ensures semantically correct processing of transactions, that is, the atomic execution of multiple message deliveries, during network partitions and node failures. The invention supports processing of transactions spanning multiple sub-clusters as illustrated in Drawing 4. For transaction processing the Client Manager acts as the Transaction Manager, which means that the Client Manager on which the Client is connected is then responsible for coordinating and executing the different stages of the transaction with the different sub-clusters. The invention uses a 2 Phase-Commit transaction scheme.

In order to use transactions, the Client must specify its session to be transacted. By specifying a session to be transacted, the Client is required at some point to either commit or abort a complete set of messages sent to or received from the cluster. The 2 Phase Commit process is handled entirely by the transaction manager in the Client Manager and is transparent in the Client. The Transaction Manager therefore does this transparently. However, there is no requirement as to how often the Client should either commit or abort the transaction. Given that the Client can commit or abort multiple times during the lifetime of the transacted session, conceptually one can say that a transacted session contains multiple autonomous transactions separated by the commit/abort instructions issued by the Client. If one of the transactions is aborted or fails it has no influence on the previous or successive transactions. Drawing 5 illustrates a transaction containing three messages and a commit executed over time. Having specified its session as transacted, a Client can send a number of messages to the Transaction Manager and Client can receive messages sent by the primary Message Manager via the Transaction Manager.

At some point the Client sends a commit to the Transaction Manager. Upon receiving the commit request the Transaction Manager transforms this into an initial prepare operation, which is then multicasted to the sub-clusters participating in the transaction, followed by a subsequent commit or abort depending on the result of the prepare request. The prepare request contains identifications of all the messages sent and received categorized per sub-cluster included in the transaction. Upon receiving the prepare request the Message Managers in the participating sub-clusters check to see if they have received all messages that they were supposed to according to the message identifications included in the prepare request. If this is the case the Message Managers respond positively to the Transaction Manager, otherwise negatively.

If only one Message Manager, primary or backup, responds negatively to the prepare request, the Transaction Manager aborts the transaction by multicasting it to the sub-clusters and reports the abort to the Client. If all Message Managers respond positively the Transaction Manager multicasts a commit operation to the Message Managers in the sub-cluster participating in the transaction and subsequently reports the successful commit to the Client. Upon receiving a commit request, all Message Managers update the message store in such a way that the send operations are now public and that the messages received are now considered to be delivered.

State changes caused by node failures and network partitions pose a problem to the transaction processing. During a state change the execution environment of the transaction may change in such a way that the transaction could break the semantics of message handling if this situation is not handled correctly. This could for instance happen in the case where a Transaction Manager gets partitioned from the cluster/sub-cluster along with a primary Message Manager that gets demoted to restricted/retaining primary Message Manager. To avoid the semantics from being broken, a state change in a participating sub-cluster or the whole cluster therefore triggers an abort of a transaction by the Message Managers participating in the transaction if:

the consequence of the state change is that the Partition State of the partition containing the Transaction Manager changes to D (even if it already was D)

or the Transaction Manager is unavailable to the cluster/sub-cluster(s) participating in the transaction, that is, crashes or gets separated away into another partition.

In all other cases the transaction is not aborted, but will continue from where it left once the cluster has settled into it's new state.

At each Message Manager within a sub-cluster, the messages received and sent are marked with a tag stating that they are locked as a part of a transacted session and have not yet been committed. The transactions used are non-blocking in the sense that the locks held on the messages, obtained by the Transaction Manager, will be released as soon as a state change forces a transaction to abort. This means that the nodes in the transaction implicitly have a timeout value used by the underlying multicast layer to detect failures. However, there are no other timeout values that can affect the transactions.

If the Transaction Manager crashes or is partitioned away from the Message Managers during the executing of transaction, but before committing or aborting it, all the Message Managers participating in the transaction will simply abort the transaction after having realized the event via a View State change. If the Transaction Manager crashes, the Client initiating the transaction will receive an exception telling it that it lost the connection to the Transaction Manager and that the current transaction thus failed. The same happens if the Client initiating the transaction is partitioned away from the Transaction Manager. Included in the exception is the transaction sequence number. Using this transaction sequence number, the Client will at some point reconnect to another Client Manager and reinitialize its transaction, which is then restarted using a new Transaction Manager.

If the Transaction Manager becomes unavailable immediately after having received a request to commit from the Client, the Client will receive an exception that the connection to the Transaction Manager—Client Manager—has been lost. However, the Client does not know what happened to the transaction, that is, whether it actually committed or not. Having established a new connection by reconnecting to another Client Manager, the Client now tries to recover the transaction. The Client cannot just abort the transaction at this stage, because if the previous commit succeeded the messages may already be publicly accessible and for instance consumed by other Clients. Given that the Client does not know whether the previous commit was actually executed, it attempts to recommit the transaction from the new Transaction Manager—Client Manager. For this to be semantically valid, the commit operation is idempotent, so that no harm is done if the previous commit was in fact executed and a subsequent recommit of the same transaction occurs.

To reissue a commit, the transaction and the part of the transaction to be committed, that is, the messages sent and received since the last commit, should be identifiable to ensure that the right part of the right transaction is committed. The reason that each commit/abort part of the transaction must be uniquely identifiable is to ensure that a reissued commit does not commit a wrong part of the transaction.

Upon receiving the recommit operation, the new Transaction Manager transforms it into a prepare operation followed by a commit or abort. This is the default 2-Phase-Commit transaction processing behavior. If the result of the prepare operation is positive, meaning that all the Message Managers—primaries and backups—participating in the transaction respond positively to the prepare operation, this means that the previous commit actually succeeded. If, on the other hand, the Message Managers participating in the transaction respond negatively to the prepare operation, this means that the previous commit did not succeed, and thus the transaction has been aborted following the state change triggered by the failure of the previous Transaction Manager. The above also applies to the scenario where the Transaction Manager fails after having received an abort operation from the Client.

In order for the scenarios above to work, each Message Manager—primaries as well as backups—participating in a transaction must for each transacted session keep track of the last performed transaction sequence number and the result of this transaction. This information is persisted by each Message Manager—primaries and backups.

In summary, the advantages featured by the invention comprise the following:

The method according to the invention guarantees JMS semantics during node failures and network partitioning of a clustered message passing system.

The invention specifically guarantees that no messages are delivered more than once to a client application during node failures and network partitioning of a clustered message passing system except for the exceptions as specified in the JMS specification.

The invention specifically guarantees that no messages are lost during node failures and network partitioning of a clustered message passing system, except for the permissible exceptions as specified in the JMS specification.

The invention specifically guarantees that all topic messages at some point are delivered to all client applications during node failures and network partitioning of a clustered message passing system, except if the topic messages expire before the recovery of the node failure or network failure.

The invention, as an extension to guaranteeing JMS semantics, insures that the clustered message passing system is always available to accept messages from message producers, and guarantees proper delivery of those messages, even when the cluster is subject to network partitioning. This of course assumes that not all nodes in the clustered message passing system have crashed.

Numerous other embodiments may be envisaged without departing from the spirit and scope of the invention.

Glossary of Terms Used

Cluster: A group of processes that run on more that one computer and work together to act like a single message passing server, but with increased performance and reliability. To a client, a cluster is functionally equivalent to a monolithic server, and it is thus transparent to the client.

Node: A single logical process within a cluster. Often a node will correspond to a single computer, but this not strictly the case. Multiple nodes sharing a computer will interact with other as though they are on different computers connected only by a network.

Monolithic Server: A complete message server running as a single node.

Server Instance: Generic term for a single logical message server. This can be a monolithic server or cluster as defined above.

Client: An application program connects to a node in a cluster to send (publish) messages to, or receive (consume) messages from, a server instance.

JMS: (Java Message Service) A standard application programming interface (API) for programs written in the Java language to use for accessing the services of a message system.

We claim:

1. For a message system for delivering data in the form of messages between message clients, the message system comprising a server cluster containing a group of message manager nodes with means for storing and distributing messages a method for ensuring operation during node failures and network partitioning, the method comprising:

Maintaining, in each running message manager node, a cluster state data set comprising information about the nodes present in the cluster Repeatedly evaluating, in each running one of said message manager nodes, a view state data set comprising information about the server nodes able to communicate with said message manager node, Comparing said cluster state data set with said view state data set and evaluating if all message managers are able to communicate with said message manager node, If not all message managers are able to communicate with said message manager node, determining an operational state for point-to-point style messaging out of at least two different states, where a first one of said at least two different states is an unrestricted state for normal operation, the message managers being in said unrestricted state being allowed to dispatch point-to-point messages sent both prior to and since the last change of the view state of the current network, and a second one of said two different states is a restricted state, the message managers being in said restricted state not being allowed to dispatch point-to-point messages sent prior to the last change of the view state of the current network, and where the operational state is determined in a manner that of any two message manager nodes that are responsible for dispatching the same point-to-point messages not being able to communicate with each other, at most one can be in an unrestricted operational state.

2. The method of claim 1, further comprising, if not all message managers are able to communicate with said message manager node, determining an operational state for publish/subscribe style messaging out of at least two different states, where a first one of said at least two different states is an non-retaining state for normal operation, the message managers being in said non-retaining state being allowed to delete publish/subscribe messages as soon as it has determined that all eligible subscribes have received copies of those messages, and a second one of said two different states is a retaining state, the message managers being in said retaining state not being allowed to delete publish/subscribe messages prior to the expiry of the individual messages or until the message manager changes to the non-retaining state and determines that all eligible subscribers have received copies of those messages, and where the operational state is determined in a manner that of any two message manager nodes that are responsible for dispatching the same publish/subscribe messages not being able to communicate with each other, both must be in a retaining state.

3. The method of claim 2, wherein the server cluster further comprises a group of client manager nodes, the client manager nodes being programmed differently from the message manager nodes, and wherein each message manager node at all times attributed a partition state out of at least three different partition states (A, C, D), where a message manager is attributed a first partition state (A) if it is able to communicate with all other message managers responsible for dispatching the same messages, where it is attributed a further partition state (C) if is not able to communicate with all other message managers responsible for dispatching the same messages but if it is able to communicate with a majority of the client manager nodes, and where it is attributed a still further partition state (D) otherwise and where the message manager is determined to be in an unrestricted operational state if it is in the first or in the further partition state (A, C) and determined to be in a restricted operational state otherwise, and where it is determined to be in a non-retaining operational state if it is in the first partition state (A) and to be in a retaining operational state otherwise.

4. The method of claim 2, wherein the server cluster further comprises a group of client manager nodes, the client manager nodes being functionally distinct from the message manager nodes, and wherein each message manager node is at all times attributed a partition state out of at least four different partition states (A, B, C, D), where a message manager is attributed a first partition state (A) if it is able to communicate with all other message manager nodes of the cluster that are responsible for dispatching the same set of messages, where it is attributed a second partition state (B) it is either not able to communicate with a further message manager responsible for dispatching the same kind of messages and is able to communicate with a majority of the client managers or if its partition state prior to the last view state change was the second partition state and it is still able to not able to communicate with any other message manager responsible for dispatching the same messages and it is able to communicate with at least one client manager, wherein it is attributed a third partition state (C) if it is not in the first partition state (A) or the second partition state (B) and where at least one further message manager node of the cluster that is responsible for dispatching the same set of messages is either able to communicate with it and it is able to communicate with a majority of the client manager nodes and wherein it is attributed a fourth partition state (D) if it is not in the first, the second or the third partition state with the additional restriction that it is not attributed the second state (B) or the third state (C) when, prior to the last change in the view state, it was in the fourth state (D)

and where the message manager is determined to be in an unrestricted operational state if it is in the first, the second or the third partition state (A, B, C) and determined to be in a restricted operational state otherwise, and where it is determined to be in a non-retaining operational state if it is in the first partition state (A) and to be in a retaining operational state otherwise.

5. The method of claim 1 wherein the message manager nodes are attributed an operational state for point-to-point messaging at all times when the server system is running.

6. The method of claim 2, wherein the message manager nodes are attributed an operational state for publish/subscribe messaging at all times when the server system is running.

7. For a message system for delivering data in the form of messages between message clients, the message system comprising a server cluster containing a group of message manager nodes with means for storing and distributing messages a method for ensuring operation during node failures and network partitioning, the method comprising:
Maintaining, in each running message manager node, a cluster state data set comprising information about the nodes present in the cluster
Repeatedly evaluating, in each running one of said message manager nodes, a view state data set comprising information about the server nodes able to communicate with said message manager node,
Comparing said cluster state data set with said view state data set and evaluating if all message managers are able to communicate with said message manager node,
If not all message managers are able to communicate with said message manager node, determining an operational state for publish/subscribe style messaging out of at least two different states, where
a first one of said at least two different states is an non-retaining state, the message managers being in said non-retaining state being allowed to delete publish/subscribe messages as soon as it has determined that all eligible subscribes have received copies of those messages, and
a second one of said two different states is a retaining state, the message managers being in said retaining state not being allowed delete publish/subscribe messages prior to the expiry of the individual messages or the message manager changes to the non-retaining state and determines that all eligible subscribers have received copies of those messages,
and where the operational state is determined in a manner that of any two message manager nodes that are responsible for dispatching the same publish/subscribe messages not being able to communicate with each other, both must be in a retaining state.

8. For a message system for delivering data in the form of messages between message clients, the message system comprising a server cluster divided into sub-clusters containing a group of message manager nodes with means for storing and distributing messages a method for ensuring operation during node failures and network partitioning, the method comprising:
Maintaining, in each running message manager node a sub-cluster state data set comprising information about the servers present in the cluster
Repeatedly evaluating, in each running one of said message manager nodes, a view state data set comprising information about the server nodes able to communicate with said message manager node,
Comparing said sub-cluster state data set with said view state data set and evaluating if all message managers of the sub-cluster are able to communicate with said message manager node,
If not all message managers of the sub-cluster are able to communicate with said message manager node, determining a point-to-point operation state out of at least two different states, where
a first one of said at least two different states is an unrestricted state, the message servers being in said unrestricted state being allowed to dispatch point-to-point messages sent prior to and since the last change of the view state of the current network, and
a second one of said two different states is a restricted state, the message servers being in said restricted state not being allowed to dispatch point-to-point messages sent prior to the last change of the view state of the current network,
and where the operational state is determined in a manner that of two message manager nodes of the same sub-cluster not being able to communicate with each other, at most one can be in an unrestricted state.

9. The method of claim 8 further comprising, if not all message managers of the sub-cluster are able to communicate with said message manager node, determining an operational state for publish/subscribe style messaging out of at least two different states, where
a first one of said at least two different states is an non-retaining state for normal operation, the message managers being in said non-retaining state being allowed to delete publish/subscribe messages as soon as it has determined that all eligible subscribes have received copies of those messages, and
a second one of said two different states is a retaining state, the message managers being in said retaining state not being allowed to delete publish/subscribe messages prior to the expiry of the individual messages or until the message manager changes to the non-retaining state and determines that all eligible subscribers have received copies of those messages,
and where the operational state is determined in a manner that of any two message manager nodes of the same sub-cluster not being able to communicate with each other, both must be in a retaining state.

10. For a message system for delivering data in the form of messages between message clients, the message system comprising a server cluster containing a group of message manager nodes with means for storing and distributing messages a method for guaranteeing JMS semantics during node failures and network partitioning, the method comprising:
Maintaining, in each running message manager node, a cluster state data set comprising information about the nodes present in the cluster
Repeatedly evaluating, in each running one of said message manager nodes, a view state data set comprising information about the server nodes able to communicate with said message manager node,
Comparing said cluster state data set with said view state data set and evaluating if all message managers are able to communicate with said message manager node,
If not all message managers are able to communicate with said message manager node, determining an operational state for point-to-point style messaging out of at least two different states, where
- a first one of said at least two different states is an unrestricted state for normal operation, the message managers being in said unrestricted state being allowed to dispatch point-to-point messages sent both prior to and since the last change of the view state of the current network, and
- a second one of said two different states is a restricted state, the message managers being in said restricted state not being allowed to dispatch point-to-point messages sent prior to the last change of the view state of the current network,
- and where the operational state is determined in a manner that of any two message manager nodes that are responsible for dispatching the same point-to-point messages not being able to communicate with each other, at most one can be in an unrestricted operational state,
- and further comprising, if not all message managers are able to communicate with said message manager node, determining an operational state for publish/subscribe style messaging out of at least two different states, where
- a first one of said at least two different states is an non-retaining state for normal operation, the message managers being in said non-retaining state being allowed to delete publish/subscribe messages as soon as it has determined that all eligible subscribes have received copies of those messages, and
- a second one of said two different states is a retaining state, the message managers being in said retaining state not being allowed to delete publish/subscribe messages prior to the expiry of the individual messages or until the message manager changes to the non-retaining state and determines that all eligible subscribers have received copies of those messages,
- and where the operational state is determined in a manner that of any two message manager nodes that are responsible for dispatching the same publish/subscribe messages not being able to communicate with each other, both must be in a retaining state.

11. A message system for delivering data in the form of messages between message clients, comprising a server cluster containing a group of message manager nodes with means for storing and distributing messages a method for ensuring operation during node failures and network partitioning, wherein each message manager node comprises means for Maintaining, in each running message manager node, a cluster state data set comprising information about the nodes present in the cluster Repeatedly evaluating, in each running one of said message manager nodes, a view state data set comprising information about the server nodes able to communicate with said message manager node, Comparing said cluster state data set with said view state data set and evaluating if all message managers are able to communicate with said message manager node, If not all message managers are able to communicate with said message manager node, determining an operational state for point-to-point style messaging out of at least two different states, where
- a first one of said at least two different states is an unrestricted state for normal operation, the message managers being in said unrestricted state being allowed to dispatch point-to-point messages sent both prior to and since the last change of the view state of the current network, and
- a second one of said two different states is a restricted state, the message managers being in said restricted state not being allowed to dispatch point-to-point messages sent prior to the last change of the view state of the current network,
- and wherein said means for determining an operational state out of at least two states are configured in a manner that of two message manager nodes that are responsible for dispatching the same point-to-point messages not being able to communicate with each other, at most one can be in an unrestricted operational state.

12. The system of claim 11, further comprising means for, if not all message managers are able to communicate with said message manager node, determining an operational state for publish/subscribe style messaging out of at least two different states, where
- a first one of said at least two different states is an non-retaining state for normal operation, the message managers being in said non-retaining state being allowed to delete publish/subscribe messages as soon as it has determined that all eligible subscribes have received copies of those messages, and
- a second one of said two different states is a retaining state, the message managers being in said retaining state not being allowed to delete publish/subscribe messages prior to the expiry of the individual messages or until the message manager changes to the non-retaining state and determines that all eligible subscribers have received copies of those messages,
- and the means for determining an operational state are programmed in a manner that that of any two message manager nodes that are responsible for dispatching the same publish/subscribe messages not being able to communicate with each other, both must be in a retaining state.

13. A computer program product comprising a computer usable medium having computer readable program code means embodied therein for enabling a computer to serve as a message manager in a server cluster, the program product comprising computer readable code means for enabling the computer To maintain, in each running message manager node, a cluster state data set comprising information about the nodes present in the cluster To Repeatedly evaluate, in each running one of said message manager nodes, a view state data set comprising information about the server nodes able to communicate with said message manager node, To compare said cluster state data set with said view state data set and to evaluate if all message managers are able to communicate with said message manager node, If not all message managers are able to communicate with said message manager node, to determine an operational state for point-to-point style messaging out of at least two different states, where
- a first one of said at least two different states is an unrestricted state for normal operation, the message managers being in said unrestricted state being allowed to dispatch point-to-point messages sent both prior to and since the last change of the view state of the current network, and a second one of said two different states is a restricted state, the message managers being in said restricted state not being allowed to dispatch point-to-point messages sent prior to the last change of the view state of the current network, and where the means for determining an operational state are programmed in a manner that of any two message manager nodes that are responsible for dispatching the same point-to-point messages not being able to communicate with each other, at most one can be in an unrestricted operational state.

14. A computer program product according to claim 13, wherein said computer readable code means comprise means employing a library written in the Java language and conforming to the Java Message Service API.

* * * * *